3,247,178
SYNTHESIS OF PEPTIDES CONTAINING α,ω-DIAMINO ACIDS PROTECTED BY PHTHALYL AND t-BUTYLOXYCARBONYL GROUPS

Robert Schwyzer, Riehen, and Peter Sieber, Basel, Switzerland, assignors to Ciba Corporation, New York, N.Y., a corporation of Delaware
No Drawing. Filed Sept. 11, 1962, Ser. No. 222,966
Claims priority, application Switzerland, Sept. 13, 1961, 10,599/61; Mar. 14, 1962, 3,069/62
17 Claims. (Cl. 260—112.5)

The present invention relates to a new process for the manufacture of peptides which contain a lower α:ω-diamino-alkanoic acid, particularly with 4 to 6 carbon atoms, such as lysine, ornithine or α:γ-diaminobutyric acid; for the synthesis of natural peptides the L-form of the amino acids is used.

In the synthesis of peptides containing an α:ω-diaminoalkanoic acid it is necessary to temporarily protect the two amino groups and selectively liberate only the α-amino group from among the protected groups. The selective elimination of the protected α-amino group has hitherto not been possible in maiy cases, because with the known combinations of protecting groups in α- and ω-position, the ω-amino protecting group was eliminated together with the α-amino protecting group.

It has now been found that in the synthesis of peptides containing α:ω-diamino-alkanoic acids the ω-amino group is protected advantageously by the phthalyl radical and the α-amino group by the tertiary butyloxycarbonyl group, and that from the peptides obtained by condensation in known manner the tertiary butyloxycarbonyl group is removed by an acidic agent in known manner and at the end of the synthesis the phthalyl group is split off in the presence of hydrazine in a weakly acidic medium.

The condensation of the α:ω-diaminoalkanoic acid or of a peptide containing the latter with a further amino acid or a peptide is carried out in a manner known per se.

For example, one of the amino acid or peptide molecules in the form of an ester may be linked with another amino acid or peptide molecule respectively, containing a protected amino group, in the presence of a condensing agent, such as a carbodiimide or a phosphorous acid ester halide, or the amino acid or peptide ester with a free amino group may be reacted with an amino acid or a peptide, respectively, containing an activated carboxyl group (and protected amino group), for example an acid halide, azide, anhydride, imidazolide, isoxazolide (for example, from N-ethyl-5-phenyl-isoxazolium-3'-sulfonate, see Woodward et al., J. Amer. Chem. Soc. 89, 1011 [1961]), or an activated ester, such as cyanmethyl ester or carboxy methylthiol ester. Vice versa, an amino acid or a peptide with a free carboxyl group (and protected amino group) may be reacted with an amino acid or a peptide with an activated amino group (and protected carboxyl group), e.g., a phosphite amide, respectively.

When the diamino alkanoic acid or a peptide containing the latter is fused on to the amino end of an amino acid or a peptide, an Nα-BOC-Nω-phthalyl derivative, for example Nα-BOC-Nω-phthalyllysine, is used. On the other hand, when the diamino alkanoic acid or a peptide containing the latter is fused on to the carboxyl end of an amino acid or of a peptide, the former must contain a free α-amino group; from an Nα-BOC-Nω-phthalyl derivative the BOC group must first be eliminated.

The derivatives of the diaminoalkanoic acids used as starting materials, in which the amino groups are protected in the manner indicated above, are new. Starting from the known Nω-phthalyl derivatives, for example Nε-phthalyllysine, they cannot be prepared. Surprisingly, the starting materials, for example the new Nα-tertiary butyloxycarbonyl-Nε-phthalyl-L-lysine (BOC-Lys-(Pht)-OH), may be synthesized as follows:

The carbobenzoxyl group (Z) of the known BOC-Lys(Z)-OH is split off by the catalytic hydrogenation. The new BOC-lysine so obtained is reacted with N-carbethoxy-phthalimide in an alkaline medium, to give BOC-Lys(Pht)-OH in practically quantitative yield. The other Nα-BOC-Nω-phthalyl-diamino-alkanoic acids are obtainable in an analogous manner.

It is known that a phthalyl group can be readily split off by treatment with an alkali, especially by treatment with hydrazine. But with many peptides, this kind of cleavage cannot be carried out, and this is the case, for example, with corticotropine and with α- or β-MSH, which compounds are particularly sensitive to alkalis. On the other hand, the phthalyl group is very stable towards strong acids. It has now unexpectedly been found that the phthalyl group can be split off in an advantageous manner in the presence of hydrazine in a weakly acidic medium at a pH-value within the range of 4–7. The medium is prepared by combining hydrazine with an organic or inorganic acid or by dissolving a hydrazine salt in an aqueous or aqueous/organic solvent. Suitable acids are, for example, hydrochloric acid, sulfuric acid, phosphoric acid, etc., or acetic acid, propionic acid, phthalic acid, benzoic acid etc.

On the other hand, the tertiary-butyloxy-carbonyl group can only be split off by treatment in strong acidic media, at a pH-value below 4. For this purpose, strong inorganic or organic acids may be used.

The difference in the behavior of the phthalyl- and of the tertiary-butyloxy-carbonyl groups towards alkaline, weakly acidic and strongly acidic media is very advantageous in the synthesis of peptides. Whereas the Nω-phthalyl group has to be retained in the Nα-BOC-Nω-phthalylpeptide molecule throughout a number of stages or even to the last stage of a synthesis of a long-chain peptide, the tertiary-butyloxycarbonyl group can be split off at any appropriate stage by treatment with a strong acid. On the other hand, if desired, the tertiary-butyloxy-carbonyl group may be retained, and the phthalyl group split off by treatment of the peptide in a weakly acidic medium comprising a hydrazine salt.

Thus, for example, the partial-sequence of the amino acids 15–25 of corticotropine given below may be obtained in excellent yield with the use of the new lysine derivative, that is to say, with the use of Nα-BOC-Nε-phthalyl-lysine. The preparation of β$^{1-24}$-corticotropin is evident from copending applications Serial No. 114,636, filed June 1, 1961, now abandoned and Serial No. 191,443, filed May 1, 1962, now abandoned.

The synthesis of the above-mentioned partial sequence is advantageously carried out according to the diagram represented below. It can be seen from this scheme that para-phenylazobenzyl alcohol is very suitable for the esterification or protection of a carboxyl group. The amino acid esters or peptide esters obtained are colored compounds, and thus facilitate the isolation and purification of these intermediates, for example, by partition-chromatography or multiplicative distribution. The colored carboxyl-protective group can subsequently be removed by hydrazinolysis, hydrolysis or by catalytic hydrogenation.

DIAGRAM 1
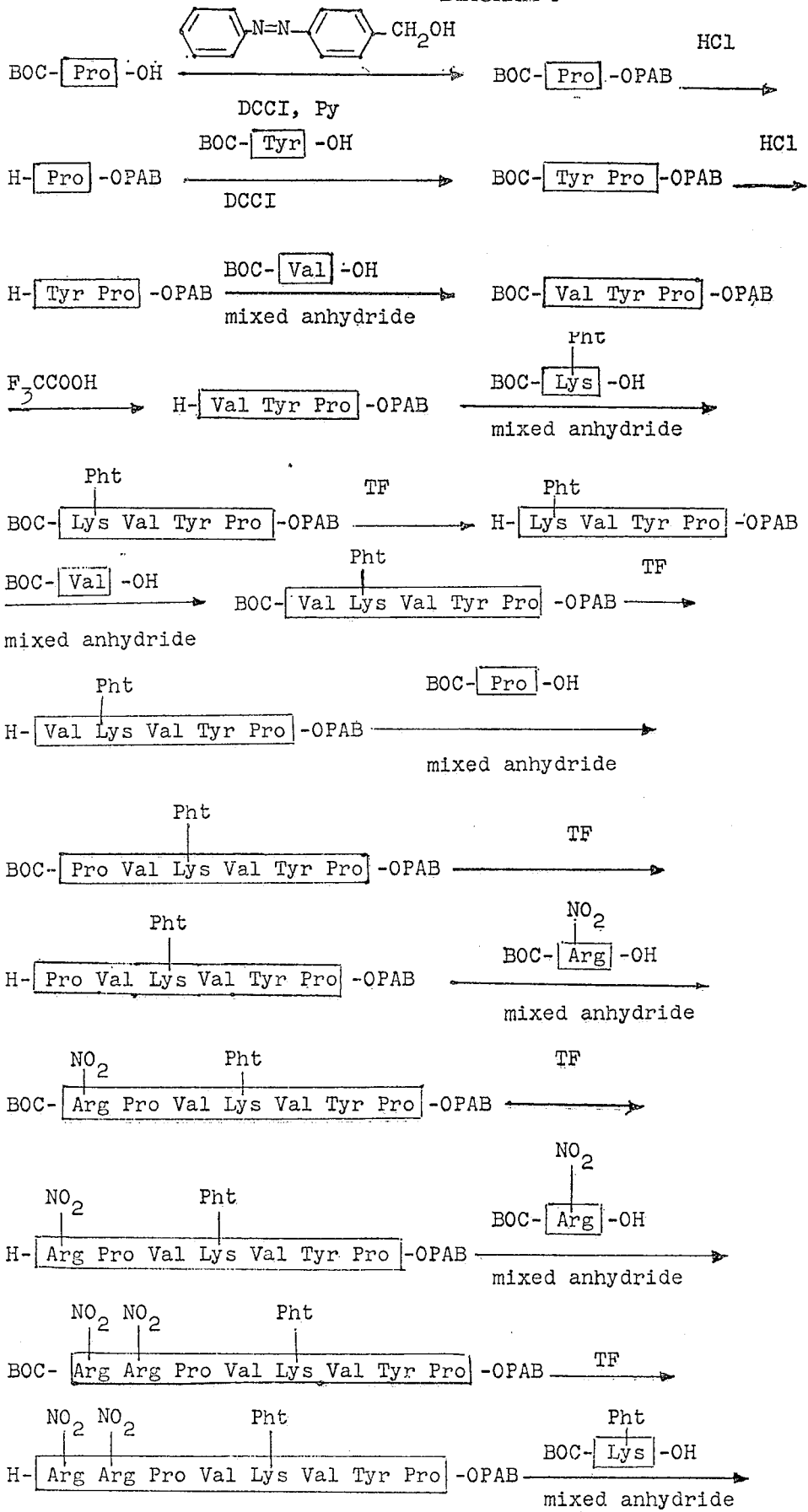

DIAGRAM 1—Continued.

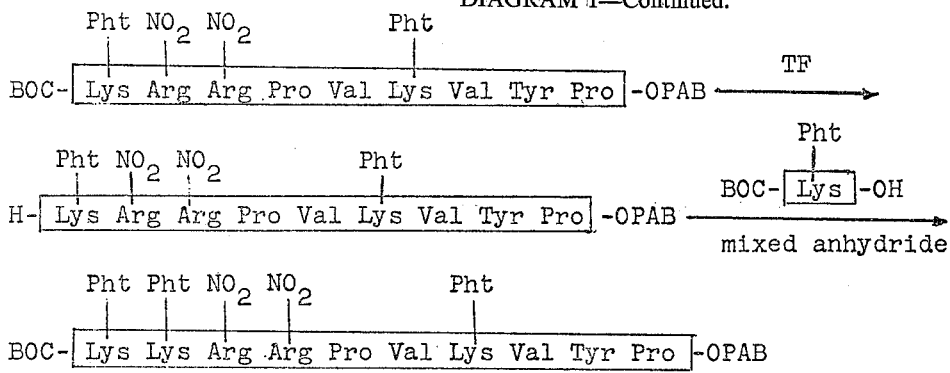

BOC represents a tertiary-butyloxy-carbonyl group, Py stands for pyridine, TF for trifluoroacetic acid, DCCI for dicyclohexyl carbodiimide, PAB for para-phenylazo-benzyl and "mixed anhydride" means the mixed anhydride method for peptide linking.

The linking of a lysine derivative with a peptide according to the method of the activated esters is illustrated in Example 4 (condensation of BOC-Lys(Pht)-pentachlorophenyl ester with Arg-Arg-Pro-Val-Lys(Pht)-Val-Tyr-Pro-OPAB).

DIAGRAM 2

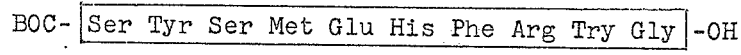

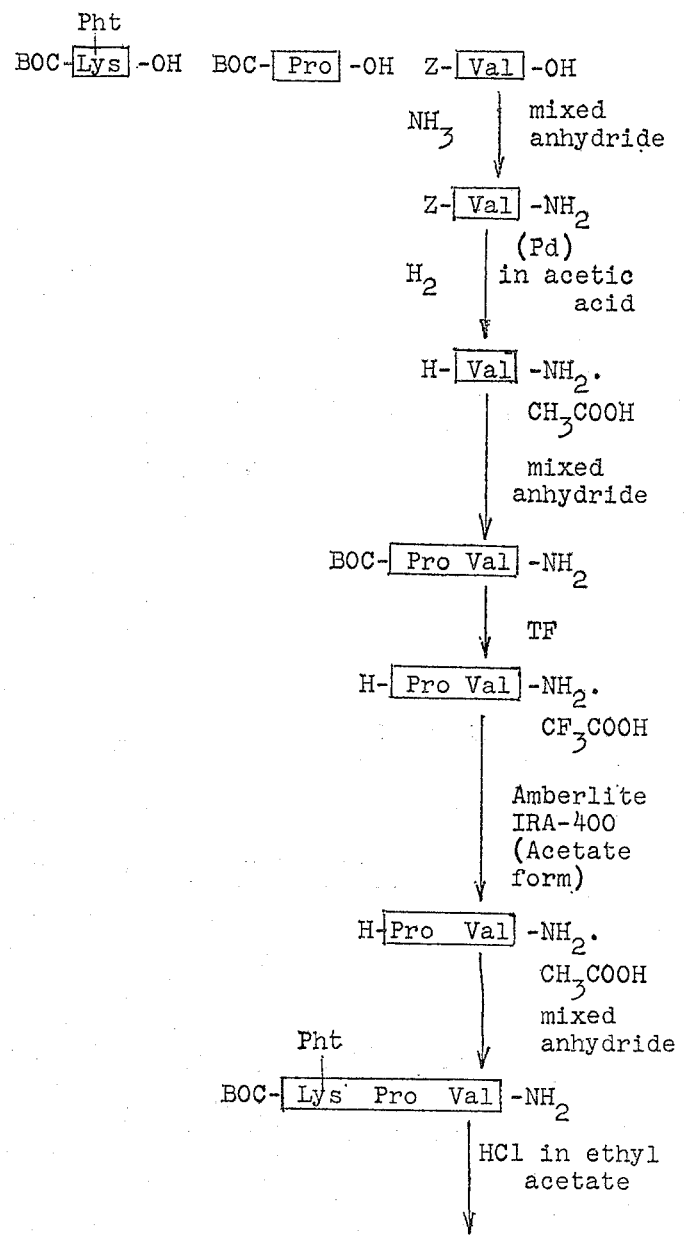

DIAGRAM 2—Continued.

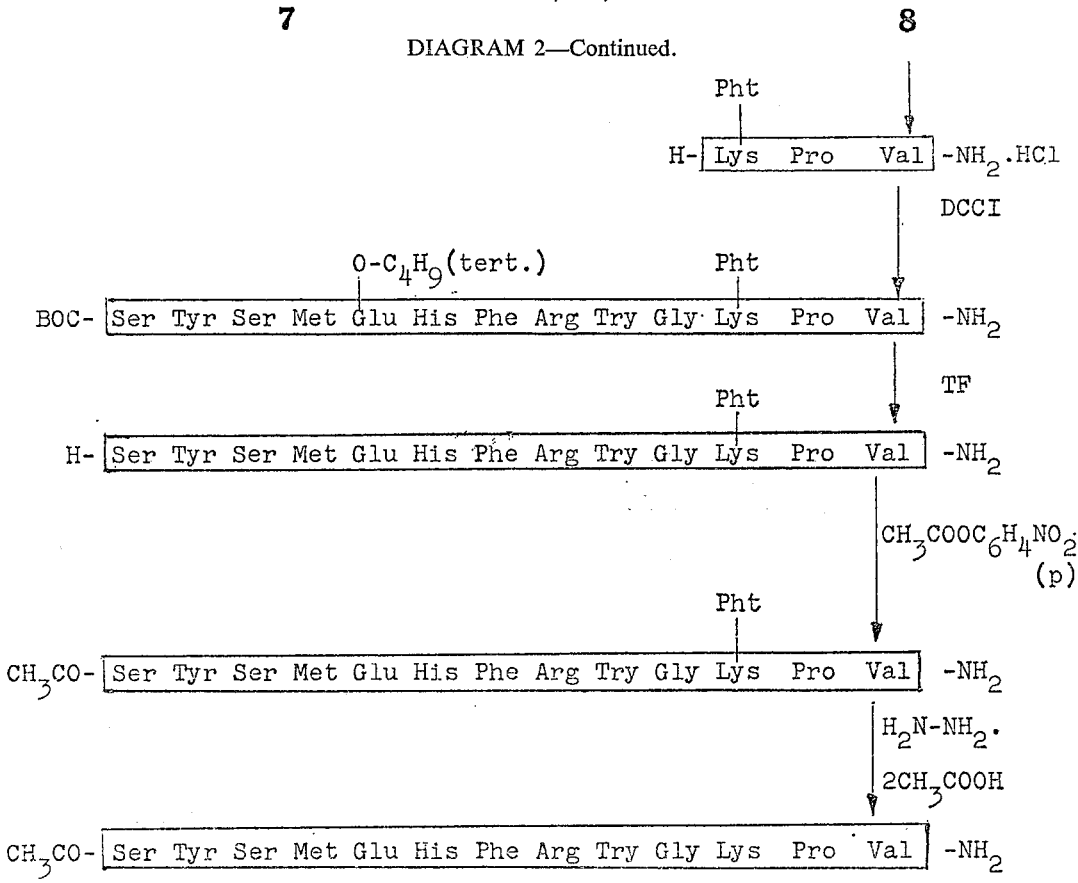

The new process can also be used with advantage for the synthesis of the α-melanophore-stimulating hormone (α-MSH) of the formula α - acetyl - L-seryl-L-tyrosyl-L-seryl - L-methionyl-L-glutamyl-L-histidyl-L-phenylalanyl-L - arginyl - L-tryptophyl-glycyl-L-lysyl-L-prolyl-L-valine-amide. This tridecapeptide was synthesised by St. Guttamann and R. A. Boissonas (Helv. Chim. Acta, 42, 1257 [1959]), although the cleavage of the protected groups presented considerable difficulty. The synthesis described here, on the other hand, in which the amino group of the lysine is protected by a phthalyl group, proceeds very smoothly. Diagram 2 shows the course of the synthesis in which the known decapeptide derivative BOC-Ser-Tyr-Ser-Met-Glu(O-tert-butyl)-His-Phe-Arg-Try-Gly-OH (cf. U.S. patent application Ser. No. 114,636, filed June 5, 1961, by R. Schwyzer et al.) is linked with the tripeptide derivative $N^\epsilon$-phthalyl-L-lysyl-L-prolyl-L-valine-amide.

The following examples illustrate the invention:

Example 1

*BOC-Lys(Pht)-OH.*—41 grams of BOC-lys(Z)-OH [see G. H. Anderson and A. C. McGregor, J.A.C.S., 79, 6180 (1957)] are hydrogenated in 400 ml. of methanol of 95% strength, in the presence of 4.1 grams of 10% palladium-carbon. After removing the catalyst by filtration, the filtrate is evaporated under vacuum. The residual foam is dissolved in 100 ml. of absolute ethanol, and by allowing the solution to stand, BOC-L-lysine crystallizes out. A toal of 24 grams, equivalent to a yield of 90% is obtained, and the product melts at 204–205° C. with decomposition. The compound can be re-crystallized from water/acetone. By means of paper chromatography, it is shown to be a pure compound, the melting point does not change on recrystallization.

17.6 grams of the $N^\alpha$-BOC-L-lysine are dissolved in 70 ml. of water containing 7.6 grams of anhydrous sodium carbonate. 19.7 grams of N-carbethoxy-phthalimide are stirred into the solution, and stirring is continued for a further 30 minutes. The solution is then clarified by filtration, cooled to 0° C., adjusted to a pH-value of 2 by means of 2-normal hydrochloric acid and then extracted with ethyl acetate. The ethyl acetate extracts are then extracted with 120 ml. of a saturated solution of sodium bicarbonate, these extracts are acidified and 2-normal hydrochloric acid, and then extracted with ethyl acetate. The ethyl acetate extracts are washed, dried and evaporated to yield 26.6 grams (=99% of theory) of a colorless glass-like product. The compound is chromatographically pure.

Example 2.—Experiments in the clevage of the phthalyl group (a) *From Lys (Pht)-OH.*—1.565 grams of $N^\epsilon$-phthalyl-L-lysine hydrochloride [see G. H. L. Nefkens, G. I. Tesser and R. J. F. Nivard, Rec. Trav. Chim. Pays-Bas, 79, 688 (1960)] are dissolved in 8 ml. of water. 1.46 ml. of hydrazine hydrate and 1.43 ml. of glacial acetic acid in 3 ml. of methanol are added to the solution at 50° C., and this is then boiled for a short time and then allowed to stand at 50° C. for a further 2 hours. A heavy precipitate is obtained. The mixture is cooled to 0° C., filtered and the residue is washed with water. 747 mg. of phthalyl hydrazide (=92% of theory) are obtained. The filtrate is analysed by thin-layer chromatography, and apart from a large proportion of lysine, still contains only a small amount of the $N^\epsilon$-phthalyl-lysine.

(b) *From BOC-Lys(Pht)-Val-Tyr-Pro-para-phenylazo-benzyl-ester.*—465 mg. of BOC-Lys(Pht)-Val-Tyr-Pro-OPAB (prepared as described in Example 3(e)), together with 5 ml. of 2-molar hydrazine hydrate + 2-molar acetic acid (pH-value 6.5) are allowed to stand in methanol at 50° C., and 0.5 ml. samples are periodically removed. The samples are diluted with ethyl acetate, extracted with a solution of potassium carbonate, evaporated to dryness and analysed by thin-layer chromatography using a chloroform/acetone system 7:3).

The analysis shows that most of the starting material has disappeared after 2 hours, and that it has completely disappeared after 17 hours. A corresponding increase in BOC-Lys-Val Tyr-Pro-OPAB spots takes place.

The hydrazinolysis of the ester takes place as a side-reaction which is apparent in the formation of paraphenylazobenzyl alcohol. This side-reaction takes place substantially slower than the clevage of the phthalyl group.

*Example 3*

(a) *Pro-OPAB, HCl.*—20.9 grams of BOC-L-proline and 22.7 grams of paraphenylazobenzyl alcohol are dissolved in 200 ml. of pyridine, then treated at 0° C. with 22 grams of dicyclohexyl carbodiimide and then allowed to stand at room temperature overnight. After adding a few mls. of glacial acetic acid, the mixture is cooled to 0° C. and the dicyclohexyl urea is filtered off. After distillation of the pyridine from the filtrate, the residue is dissolved in ethyl acetate and then worked up to a neutral product by treatment with 0.5-normal hydrochloric acid and with a solution of sodium bicarbonate. About 40 grams of a red oil are thus obtained.

This product is dissolved in 100 ml. of absolute ethyl acetate and then treated with 500 ml. of 3-normal hydrochloric acid in ethyl acetate. After ½ hour, the mixture is evaporated to dryness at 40° under vacuum. The residue is dissolved in 500 ml. of chloroform and filtered through a column consisting of 1 kilogram of silica gel. An impurity is removed by elution with chloroform, and the desired material is then washed out with chloroform +10% methanol. 34 grams of Pro-OPAB, HCl are obtained, and this is recrystallized from absolute ethanol to yield 26.0 grams (=77% of theory) of product melting at (177) 180° C.

(b) *Tyr-Pro-OPAB, HCl.*—1.39 grams of Pro-OPAB, HCl are dissolved in 10 ml. of water, covered with a layer of ethyl acetate and then at 0° C. rendered alkaline with potassium carbonate. The ethyl acetate extract is washed neutral and then evaporated at 40° C. under vacuum. The residue together with 1.13 grams of BOC-Tyr-OH is dissolved in 20 ml. of acetonitrile and 1 ml. of dimethyl formamide, and then at 0° C. treated with 0.91 gram of dicyclohexyl carbodiimide. The mixture is allowed to stand overnight at 0° C. and the dicyclohexyl urea is then filtered off, the filtrate is concentrated down, dissolved in ethyl acetate and then extracted with 0.5-normal hydrochloric acid and with a solution of sodium bicarbonate. The neutral product obtained is freed from the BOC group by treatment with hydrochloric acid in ethyl acetate. The hydrochloride is crystallized from methanol/ether. 1.68 grams (=82% of theory) of product melting at 204° C. with decomposition, is obtained.

(c) *BOC-Val-Tyr-Pro-OPAB.*—9 grams of BOC-Val-OH dissolved in 90 ml. of absolute tetrahydrofuran and 5.7 ml. of triethylamine are treated at −10 to −15° C. with 5.0 ml. of isobutyl-chloro-carbonate. After 15–20 minutes, 17.25 grams of Tyr-Pro-OPAB, HCl dissolved in 120 ml. of absolute dimethyl formamide, and 4.7 ml. of triethylamine in 45 ml. of absolute tetrahydrofuran are added dropwise simultaneously. The mixture is then stirred for 1 hour at 0° C. and then allowed to stand in the refrigerator overnight. The mixture is then concentrated, dissolved in ethyl acetate and then shaken out at 0° C. with 0.5-normal hydrochloric acid and with a solution of sodium bicarbonate. The neutral product so obtained is re-crystallized from methanol/water. A yield of 20.15 grams (=88% of theory) of BOC-Val-Tyr-Pro-OPAB is obtained and the product melts at 106—108° C.

Thin-layer chromatography in chloroform/acetone (7:3) shows a pure compound that has an R*f*-value of 0.54.

(d) *Val-Tyr-Pro-OPAB.*—50 ml. of trifluoroacetic acid are poured over 17.0 grams of water-cooled BOC-Val-Tyr-Pro-OPAB, and the mixture is shaken until a solution is obtained. The solution is allowed to stand for 5 minutes at room-temperature and then evaporated at room-temperature under vacuum. The oil obtain is dissolved in chloroform, extracted once with water, and the chloroformic solution is then stirred at 0° C. with a saturated solution of sodium bicarbonate until there is no further evolution of carbon dioxide. The chloroformic layer is separated, dried with sodium sulfate and then evaporated to dryness. 14.8 grams of Val-Tyr-Pro-OPAB are obtained (=100% of theory).

Thin-layer chromatogram:

Chloroform/acetone (7:3):pure compound, R*f*-value—0.2.

Benzene/acetone (1:1):pure compound, R*f*-value—0.45.

(e) *BOC-Lys(Pht)-Val-Tyr-Pro-OPAB.*—A mixed anhydride is prepared from 7.4 grams of BOC-Lys(Pht)-OH, in the manner described in Example 3(c), and it is reacted with 6.43 grams of Val-Tyr-Pro-OPAB. 9.08 grams of BOC-Lys(Pht)-Val-Tyr-Pro-OPAB (=87% of theory)) are obtained.

Thin-layer chromatogram:

Chloroform/acetone (7:3):pure compound, R*f*-value—0.4.

Benzene/acetone (1:1):pure compound, R*f*-value—0.62.

(f) *Lys(Pht)-Val-Tyr-Pro-OPAB.*—9.08 grams of BOC-tetrapeptide are treated with trifluoroacetic acid and worked up in the manner described in Example 3(d)). 8.1 grams of Lys(Pht)-Val-Tyr-Pro-OPAB (=100% of theory) are obtained.

Thin-layer chromatogram:

Chloroform/acetone (7:3):pure compound, R*f*-value—0.16.

Benzene/acetone (1:1):pure compound, R*f*-value—0.42.

(g) *BOC-Val-Lys(Pht)-Val-Tyr-Pro-OPAB.*—By reacting 3.5 grams of BOC-Val-OH and 8.1 grams of Lys(Pht)-Val-Tyr-Pro-OPAB and working up in the manner described in Example 3(c)), 8.8 grams (=88% of theory) of BOC-pentapeptide are obtained.

Thin-layer chromatogram:

Chloroform/acetone (7:3):pure compound, R*f*-value—0.36.

Benzene/acetone (1:1):pure compound, R*f*-value—0.65

(h) *Val-Lys(Pht)-Val - Tyr - Pro - OPAB.*—From 8.8 grams of BOC-pentapeptide ester obtained above and trifluoracetic acid in the manner described in Example 3(d), 8.2 grams (=100% of theory) of Val-Lys(Pht)-Val-Tyr-Pro-OPAB are obtained.

Thin-layer chromatogram:

Chloroform/acetone (7:3): pure compound, R*f*-valve—0.14.

Benzene/acetone (1:): pure compound, R*f*-value—0.33.

(i) *BOC - Pro-Val-Lys(Pht)Val-Tyr-Pro-OPAB.*—3.3 grams of BOC-Pro-OH and 8.2 grams of Val-Lys(Pht)-Val-Tyr-Pro-OPAB are reacted and worked up in an analogous manner to that described in Example 3(c). 9.05 grams of BOC-Pro-Val-Lys(Pht)-Val-Tyr-Pro-OPAB (=91% of theory) are obtained.

Thin-layer chromatogram:

Chloroform/acetone (7:3): pure compound, R*f*-value—0.25.

Benzene/acetone (1:1): pure compound, R*f*-value—0.49.

Chloroform/methanol (9:1): pure compound, R*f*-value—0.75.

(k) *H - Pro - Val-Lys(Pht)-Val-Tyr-Pro-OPAB.*—By working up 9.05 grams of BOC-Pro-Val-Lys(Pht)-Val-Tyr-Pro-OPAB with trifluoroacetic acid in the manner described in Example 3(d), 8.65 grams (=100% of theory) of Pro - Val-Lys(Pht)-Val-Tyr-Pro-OPAB are obtained.

Thin-layer chromatogram:

Chloroform/methanol (9:1): R*f*-value—0.38.

A sample of the peptide is converted into Pro-Val-Lys(Pht)-Val-Tyr-Pro-OH, by hydrogenation. This compound is freed from the phthalyl group by treatment with hydrazine and acetic acid in the manner described in Example 2. The free hexa-peptide is analysed paper chromatographically and electrophoretically, and is found to be a pure compound. A free peptide is then exhaustively hydrolysed, and the products are subjected to a quantitative amino-acid analysis. The analysis shows— lysine: 0.96, ammonia: 0.28, valine: 2.0, proline: 2.13 and tyrosine: 0.87.

(*l*) *BOC - Arg(NO₂) - Pro - Val-Lys(Pht)-Val-Tyr-Pro-OPAB*.—By treating 893 mg. of BOC-Arg(NO₂)-OH and 2.05 grams of Pro-Val-Lys(Pht)-Val-Tyr-Pro-OPAB in the manner described in Example 3(c), 2.21 grams (=83% of theory) of BOC-heptapeptide are obtained.

Thin-layer chromatogram:
Chloroform/methanol (9:1):

Main component—0.58
Impurity—0.79

The impurity can be more readily removed after the BOC group has been split off, so that the product is not purified at this stage.

(m) *Arg(NO₂) - Pro - Val - Lys(Pht)-Val-Tyr-Pro-OPAB*.—3.06 grams of the mixture described in Example 3(l) is reacted with trifluoracetic acid and worked up in the manner described in Example 3(d). The crude product obtained is chromatographed over 30-times its quantity of aluminum oxide (activity III). The impurity is eluted with chloroform/acetone (7:3), Arg-(NO₂)-Pro-Val-Lys(Pht)-Val-Tyr-Pro-OPAB remains at the top of the column, is retained. After discharging the column, the product is extracted with tetrahydrofurane/water (9:1), and 2.14 grams thereof is obtained (=76% of theory).

Thin-layer chromatogram:

Chloroform/methanol (9:1): pure compound, R*f*-value—0.13.

(n) *BOC - Arg-(NO₂)-Arg-(NO₂)-Pro-Val-Lys(Pht)-Val-Tyr-Pro-OPAB*.—By treating 910 mg. of BOC-Arg (NO₂)-OH and the 2.14 grams of Arg(NO₂)-Pro-Val-Lys(Pht)-Val-Tyr-Pro-OPAB obtained above, in the manner described in Example 3(c), 2.33 grams (=87% of theory) of BOC-octapeptide-ester are obtained.

Thin-layer chromatogram:

Chloroform/methanol (9:1): pure compound, R*f*-value—0.36.

(o) *Arg(NO₂) - Arg(NO₂) - Pro-Val-Lys(Pht)-Val-Tyr-Pro-OPAB*.—By treating 3.4 grams of BOC-octapeptide ester in the manner described in Example 3(d), 3.3 grams (=100% of theory) of Arg(NO₂)-Arg(No₂)-Pro-Val-Lys(Pht)-Val-Tyr-Pro-OPAB are obtained.

Thin-layer chromatogram:

Chloroform/methanol (9:1): pure compound, R*f*-value—0.03.

(p) *BOC - Lys(Pht) - Arg(NO₂)-Arg(NO₂)-Pro-Val-Lys(Pht)-Val-Tyr-Pro-OPAB*.—1.29 grams of BOC-Lys-(Pht,-OH and 3.1 grams of octapeptide-ester are reacted in the manner described in Example 3(c). The working up, however, is carried out somewhat differently, the precipitated tri-ethylammonium chloride being filtered off, and the filtrate added dropwise into ether. The precipitate so obtained is filtered and yields 3.56 grams (92% of theory) of BOC-nonapeptide ester.

Thin-layer chromatogram:

Chloroform/methanol (9:1): pure compound, R*f*-value—0.5.
Dioxane/water (9:1): pure compound, R*f*-value—0.73.

(q) *Lys(Pht - Arg(NO₂) - Arg(NO₂) - Pro - Val - Lys-(Pht)-Val-Tyr-Pro-OPAB*.—3.40 grams of BOC-nonapeptide-ester are treated with trifluoracetic acid in the manner described in Example 3(d). 3.30 grams (100% of theory) of Lys (Pht) - Arg(NO₂)-Arg(NO₂)-Pro-Val-Lys(Pht)-Val-Tyr-Pro-OPAB are obtained.

Thin-layer chromatogram:

Chloroform/methanol (9:1): pure compound, R*f*-value—0.12.
Dioxane/water (9:1): pure compound R*f*-value—0.62.

(r) *BOC - Lys(Pht) - Lys(Pht) - Arg(NO₂) - Arg-(NO₂) - Pro - Val - Lys(Pht) - Val - Tyr - Pro - OPAB*.— By treating 1355 mg. of BOC-Lys(Pht)-OH and 3.30 grams of Lys(Pht)-Arg(NO₂)-Arg(NO₂)-Pro-Val-Lys-(Pht)-Val-Tyr-Pro-OPAB in the manner described in Example 3(c), 3.43 grams (=86% of theory) of BOC-decapeptide-ester are obtained.

Thin-layer chromatogram:

Chloroform/methanol (9:1): pure compound, R*f*-value—0.57.
Dioxane/water (9:1): pure compound R*f*-value—0.74.

*Example 4*

(a) *BOC - Lys(Pht) - pentachlorophenyl ester*.—50.9 grams of BOC-Lys(Pht)-OH and 43.2 grams of pentachlorophenol are dissolved in 160 ml. of absolute ethyl acetate and treated with 30.7 grams of dicyclohexylcarbodiimide at 0° C. After the reaction mixture has been allowed to stand overnight at 0° C., the dicyclohexylurea is filtered off with suction and washed well with ice-cold ethyl acetate. The filtrate is evaporated to dryness in vacuo and the residue recrystallized from 500 ml. of ethanol. A first fraction of 40.8 grams of pentachlorophenyl ester melting at 140–142° C. is obtained.

From the mother liquor a second fraction of 16.7 grams is obtained; total 68% of the theory.

For the purpose of analysis the reaction product is recrystallized again from ethanol, whereupon the melting point is 142–143° C.

(b) *BOC - Lys(Pht) - Arg - Arg - Pro - Val - Lys-(Pht) - Val - Tyr - Pro - OPAB, 2CH₃COOH*.—1.06 grams of Arg-Arg-Pro-Val-Lys(Pht)-Val-Tyr-Pro-OPAB, 3CH₃COOH, 850 mg. of BOC-Lys(Pht)-pentachlorophenyl ester, 2.5 ml. of dimethylformamide and 0.094 ml. of triethylamine are stirred for 17 hours at 40° C. After dilution with chloroform the protected nonapeptide ester is precipitated with ether, suction-filtered and well washed with ether. Yield: 1.24 grams=98% of the theory.

Thin-layer chromatogram:

Unitary in the system ethyl acetate+methylethylketone-+formic acid+water 5:3:1:1. R*f*=0.4.

*Example 5*

(a) *Z-Val-NH₂*.—25.1 grams of Z-Val-OH (R. L. M. Synge, Biochem. J., 42,99 [1948]) are dissolved in 200 ml. of absolute tetrahydrofuran and reacted with 13.8 ml. of triethylamine. 13.25 ml. of chloroformic acid isobutyl ester are added slowly dropwise at −10° C. with stirring and with the exclusion of moisture. After formation of the mixed anhydride (30 minutes), dry ammonia is introduced at −10° C. (to saturation). After a further 15 hours at 0° C., the Z-Val-NH₂ formed is filtered off and recrystallized from ethanol. It melts at 205–206° C. The yield is almost quantitative (24 grams).

(b) *Val-NH₂.CH₃COOH*.—20.3 grams of Z-Val-NH₂ are hydrogenated in a mixture of 160 ml. of glacial acetic acid and 40 ml. of water in the presence of 2 grams of 10% palladium-charcoal under atmospheric pressure until hydrogen uptake ceases. After filtering off the catalyst and evaporating the filtrate, the residue is recrystallized from 20 ml. of ethanol to give 13.4 grams of Val-NH₂.CH₃COOH melting at 102° C.

The acetate is reacted directly with the mixed anhydride of chloroformic acid isobutyl ester and tert. butoxy-carbonyl-L-proline.

(c) *BOC-Pro-Val-NH₂*.—A mixed anhydride is prepared (30 minutes at −10° C.) from 13.6 grams of BOC-Pro-OH, 8.75 ml. of triethylamine and 8.4 ml. of chloroformic acid isobutyl ester. A solution of 11.15 grams of Val-NH$_2$.CH$_3$COOH in 50 ml. of absolute tetrahydrofuran and 30 ml. of absolute dimethyl formamide is then added dropwise to the reaction mixture. After 1 hour at $-5°$ C. and 15 hours at 0° C. it is worked up to a neutral product in the usual manner (in ethyl acetate). The product is recrystallized from ether to yield 7.73 grams of BOC-Pro-Val-NH$_2$ melting at 85° C. (with decomposition).

(d) *Pro-Val*-NH$_2$.CH$_3$COOH.—7.73 grams of BOC-Pro-Val-NH$_2$ are dissolved in 25 ml. of trifluoroacetic acid with cooling. After 5 minutes, the solution is evaporated under vacuum and the residue is crystallized from ethanol/ether to yield 7.5 grams of Pro-Val-NH$_2$.CF$_3$COOH melting at 167–168° C. (with decomposition). 7.0 grams of the salt are dissolved in 50% methanol and run through a column of a strongly basic anion exchanger material (in the acetate form), for example a resin of the type commercially known as "Amberlite IRA–400", described in U.S. Patent No. 2,591,573. The filtrate is evaporated under vacuum and the residue crystallized from ether/petroleum ether to yield 5.66 grams of Pro-Val-NH$_2$.CH$_3$COOH melting at 137–138° C.

(e) *Boc-Lys(Pht)-Pro-Val*-NH$_2$.—A mixed anhydride is prepared from 5.26 grams of BOC-Lys(Pht)-OH and 1.67 ml. of chloroformic acid isobutyl ester in 30 ml. of tetrahydrofuran and 1.94 ml. of triethylamine at $-10°$ C. It is then reacted, without prior isolation, with a solution of 2.73 grams of Pro-Val-NH$_2$.CH$_3$COOH in 14 ml. of absolute dimethyl formamide. After a reaction time of 15 hours at 0° C., the solution is concentrated under vacuum, the residue is dissolved in ethyl acetate and water and worked up into a neutral product in the usual manner at 0° C. with dilute hydrochloric acid and sodium bicarbonate. The neutral product is crystallized from boiling ethyl acetate to give BOC-Lys(Pht)-Pro-Val-NH$_2$ melting at 172.5–173° C., in a 65% yield. Thin-layer chromatography on silica gel using ethyl acetate/methanol (1:3) as solvent shows that the product is a pure compound (R$f$-value—0.73) and that a small amount of impurity with an R$f$-value of 0.55 was removed during the crystallization.

(f) *Lys(Pht)-Pro-Val*-NH$_2$.HCl.—1 gram of BOC-Lys(Pht)-Pro-Val-NH$_2$ is dissolved in 10 ml. of absolute, boiling ethyl acetate, then rapidly cooled and, before it recrystallizes, reacted with 6 ml. of 2.9-normal HCl in ethyl acetate. The hydrochloride starts to crystallize out after a certain time. After 1 hour, the crystals are filtered and washed with absolute ethyl aceate and ether to give 613 mg. of product ($=69\%$ of theory). A further 98 mg. ($=11\%$) can be obtained from the mother liquors. Paper-chromatography in various systems shows the substance to be a pure compound.

(g) *BOC-Ser-Tyr-Ser-Met-Glu(O-C$_4$H$_9$tert.)-His-Phe-Arg-Try-Gly-Lys(Pht)-Pro-Val*-NH$_2$.—504 mg. of BOC-Ser-Tyr-Ser-Met-Glu(OC$_4$H$_9$tert.)-His - Phe - Arg-Try-Gly-OH (U.S. patent application Ser. No. 114,636, filed June 5, 1961, by R. Schwyzer et al.), 208 mg. of Lys(Pht)-Pro-Val-NH$_2$.HCl and 145 mg. of dicyclohexyl carbodiimide are stirred for 5 days in 5 ml. of pyridine at 20° C. so that complete solution is obtained. The product is obtained as a gelatinous precipitate with absolute chloroform and methanol. Excess tripeptide is washed out with water. The BOC-Ser-Tyr-Ser-Met-Glu(OC$_4$H$_9$tert.)-His-Phe-Arg-Try - Gly-Lys(Pht) - Pro-Val-NH$_2$ is obtained as a pure compound as can be demonstrated by thin-layer chromatography on Al$_2$O$_3$.

(h) *Ser-Tyr - Ser - Met - Glu-His-Phe-Arg-Try-Gly-Lys(Pht)-Pro-Val*-NH$_2$.3F$_3$CCOOH.—530 mg. of the tridecapeptide derivative are dissolved in 7 ml. of trifluoroacetic acid, kept at room temperature for 15 minutes and freed from solvent in a bath at 40° C. under vacuum. 518 mg. of Ser-Tyr-Ser-Met-Glu-His-Phe-Arg-Try-Gly-Lys(Pht)-Pro-Val-NH$_2$.3F$_3$CCOOH are obtained. The compound is electrophoretically pure. It gives a single spot at 13.2 cm. (positive reaction with ninhydrin, Sakaguchi, Pauly, Ehrlich) on paper after 5 hours with 7 volts/cm. in 1-normal acetic acid.

(i) CH$_3$CO - *Ser - Tyr - Ser - Met - Glu - His - Phe-Arg - Try - Gly - Lys(Pht) - Pro - Val* - NH$_2$.—The compound obtained from (h), the Ser$^1$-α-amino group of which is free and the Lys$^{11}$-ε-amino group of which is protected, is selectively acetylated at the α-amino group with acetic acid-para-nitrophenyl ester.

500 mg. of N$^\epsilon$-phthalyl-tridecapeptideamide-tri-trifluoracetate are treated in 3 ml. of absolute pyridine and 0.4 ml. of absolute dimethyl formamide with 35 mm.$^3$ of triethylamine and 92 mg. of O-acetyl-para-nitrophenol for 22 hours at room temperature. The reaction product is then precipitated with ether to give 440 mg. ($=91\%$ of theory) of CH$_3$CO - Ser - Tyr - Ser - Met - Glu - His-Phe - Arg - Try - Gly - Lys(Pht) - Pro - Val - NH$_2$(Lys$^{11}$-N$^\epsilon$-phthalyl-α-MSH). It is an electrophoretically pure compound and gives one spot at 14 cm. (positive reactions with the Pauly, Sakaguchi and Ehrlich reagents) on paper after 7 hours with 7 volts/cm. in 1-normal acetic acid.

(k) *Ac - Ser - Tyr - Ser - Met - Glu - His - Phe - Arg-Try - Gly - Lys - Pro - Val* - NH$_2$·CH$_3$COOH.—440 mg. of the Lys$^{11}$-N-phthalyl-α-MSH are heated at 50° C. for 15 hours in 20 ml. of a 2-molar methanolic hydrazine acetate solution. The solution is then thoroughly concentrated under vacuum, dissolved in 20 ml. of warm acetone (35–40° C.) and the α-MSH is then precipitated by the slow addition of ether. By continuous electrophoresis in 1-normal acetic acid, the Ac - Ser - Tyr - Ser - Met - Glu-His - Phe - Arg - Try - Gly - Lys - Pro - Val - NH$_2$·CH$_3$-COOH (α-MSH) is separated as a pure compound from about 30% of unreacted starting material. (Control by electrophoresis in pyridine/glacial acetic acid/water, 9:1:90 at a pH-value of 5.9). The starting material can be completely converted into the desired α-MSH by further reaction with hydrazine acetate.

What is claimed is:

1. In a process for the manufacture of peptides built up from natural α-amino acids and containing at least one natural α,ω-diamino acid by condensing in a series of standard peptide condensation reactions members selected from the group consisting of natural α-amino acids, peptides built up from natural α-amino acids, and derivatives thereof, the steps which comprise (a) condensing onto a carboxylic acid derivative of a member selected from the group consisting of a natural α-amino acid and a peptide built up from natural α-amino acids in which any ω-amino group present is protected by the phthalyl group, a member selected from the group consisting of a natural α-amino acid and a peptide built up from natural α-amino acids in which the α-amino group is protected by the tertiary butyloxycarbonyl radical, and any ω-amino group present is protected by the phthalyl group, and (b) after each condensation splitting off the tertiary butyloxycarbonyl radical at a pH below 4 and, at the end of all condensations, splitting off any phthalyl group by means of hydrazine in a weakly acidic medium at a pH from about 4 to about 7.

2. A process as claimed in claim 1, wherein the phthalyl radical is split off at a pH value within the range of 4 to 7.

3. A process as claimed in claim 1, wherein the acetic acid salt of hydrazine is used to split off the phthalyl radical.

4. N$^\alpha$ - tertiary butyloxy - carbonyl - N$^\omega$ - phthalyl - diamino lower alkanoic acid, said diamino lower alkanoic acid being selected from the group consisting of lysine, ornithine and α,γ-diaminobutyric acid.

5. N$^\alpha$-tertiary butyloxy-carbonyl-N$^\epsilon$-phthalyl-lysine.

6. A member selected from the group consisting of (1) peptides derived from natural amino acids, which contain at least one $N^\epsilon$-phthalyl-lysine radical and whose $\alpha$-amino group is protected by the tertiary butyloxy-carbonyl radical, (2) their esters with p-phenylazo-benzyl alcohol, pentachlorophenol and t-butyl alcohol, (3) their N-unsubstituted amides and (4) salts of these compounds.

7. A member selected from the group consisting of (1) L - seryl - L - tyrosyl - L - seryl - L - methionyl - L - glutamyl - L - histidyl - L - phenylalanyl - L - arginyl - L - tryptophyl - glycyl - $N^\epsilon$ - phthalyl - L - lysyl - L - prolyl - L - valine - amide, (2) its $N^\alpha$ - acetyl derivative and (3) salts of these compounds.

8. A member selected from the group consisting of $N^\alpha$ - tertiary butyloxy - carbonyl - L - seryl - L - tyrosyl - L - seryl - L - methionyl - $\gamma$ - tertiary butyl - L - glutamyl - L - histidyl - L - phenylalanyl - L - arginyl - L - tryptophyl - glycyl - $N^\epsilon$ - phthalyl - L - lysyl - L - prolyl - L - valine - amide and its salts.

9. $N^\alpha$ - tertiary butyloxy - carbonyl - L - valyl - $N^\epsilon$ - phthalyl - L - lysyl - L - valyl - L - tyrosyl - L - proline - para - phenylazobenzyl ester.

10. $N^\alpha$ - tertiary butyloxy - carbonyl - L - prolyl - L - valyl - $N^\epsilon$ - phthalyl - L - lysyl - L - valyl - L - tyrosyl - L - proline - para - phenylazobenzyl ester.

11. $N^\alpha$ - tertiary butyloxy - carbonyl - nitro - L - arginyl - L - prolyl - L - valyl - $N^\epsilon$ - phthalyl - L - lysyl - L - valyl - L - tyrosyl - L - proline - para - phenylazobenzyl etser.

12. $N^\alpha$ - tertiary butyloxy - carbonyl - nitro - L - arginyl - nitro - L - arginyl - L - prolyl - L - valyl - $N^\epsilon$ - phthalyl - L - lysyl - L - valyl - L - tyrosyl - L - proline - para - phenylazobenzyl ester.

13. $N^\alpha$ - tertiary butyloxy - carbonyl - $N^\epsilon$ - phthalyl - L - lysyl - nitro - L - arginyl - nitro - L - arginyl - L - prolyl - L - valyl - $N^\epsilon$ - phthalyl - L - lysyl - L - valyl - L - tyrosyl - L - proline - para - phenylazo - benzyl ester.

14. $N^\alpha$ - tertiary butyloxy - carbonyl - $N^\epsilon$ - phthalyl - L - lysyl - $N^\alpha$ - phthalyl - L - lysyl - nitro - L - arginyl - nitro - L - arginyl - L - prolyl - L - valyl - $N^\epsilon$ - phthalyl - L - lysyl - L - valyl - L - tyrosyl - L - proline - para - phenylazobenzyl ester.

15. $N^\alpha$ - tertiary butyloxy - carbonyl - $N^\epsilon$ - phthalyl - L - lysine pentachlorphenyl/ester.

16. $N^\alpha$ - tertiary butyloxy - carbonyl - $N^\epsilon$ - phthalyl - L - lysyl - L - arginyl - L - arginyl - L - prolyl - L - valyl - $N^\epsilon$ - phthalyl - L - lysyl - L - valyl - L - tyrosyl - L - proline - para - phenylazobenzyl ester.

17. $N^\alpha$ - tertiary butyloxy - carbonyl - $N^\epsilon$ - phthalyl - L - lysyl - L - prolyl - L - valine amide.

References Cited by the Examiner
UNITED STATES PATENTS 3,062,804  11/1962  Albertson _____ 260—112
3,095,408  6/1963  Anderson et al. _____ 260—112

OTHER REFERENCES

Ing. et al., J. Chem. Soc. (London), 1926, 2349.
Sheehan et al., J. Am. Chem. Soc., 74, 3823 (1952).
Boissonnas et al., Helv. Chim. Acta, 36, 875 (1953).

LEON J. BERCOVITZ, *Primary Examiner.*

DONALD E. CZAJA, *Examiner.*

M. J. WELSH, *Assistant Examiner.*